UNITED STATES PATENT OFFICE.

JOHN E. BAKER, OF YORK, PENNSYLVANIA.

PROCESS OF PREPARING MATERIAL FOR USE IN MAKING UP REPAIRING, AND REPLACING LININGS, &c., OF METALLURGICAL FURNACES.

1,063,103.

Specification of Letters Patent.

Patented May 27, 1913.

No Drawing. Application filed December 6, 1911. Serial No. 664,303.

*To all whom it may concern:*

Be it known that I, JOHN E. BAKER, a citizen of the United States, residing at York, in the county of York and State of Pennsylvania, have invented certain new and useful Improvements in Processes of Preparing Material for Use in Making Up, Repairing, and Replacing Linings, &c., of Metallurgical Furnaces, of which the following is a specification.

This invention relates to an improvement in the process of preparing material for use in making up, repairing and replacing linings, bottoms and parts of metallurgical furnaces.

In the operation of metallurgical furnaces, especially those known as open hearth furnaces, it is found that the linings thereof soon deteriorate and are destroyed at points adjacent the slag line or upper surface of the material being treated and also at various points in the bottoms thereof. It is a constant requirement on the part of the attendants to repair said damaged portions of the linings and bottoms of the furnaces and it has been ascertained that the repairs can be readily made while the furnace walls are in a heated condition by the application to the damaged parts of dolomite. Dolomite in its raw state, that is, as it comes from the quarry and after being crushed, has been used heretofore but has been ascertained to be objectionable for various causes well known to those skilled in the art. It has therefore been attempted heretofore to supply this material in a condition where the same is relieved largely of the contained volatile matter, gases, and etc. This has been accomplished by first roasting the dolomite and then reducing it to the proper size and such a product has been made heretofore by me in large quantities and then supplied to the trade. In the treatment of the dolomite under the heretofore practised method, the material has been placed in a cupola furnace, the furnace being charged with alternate layers of coke and raw crushed dolomite rock. The heat generated drives off the carbonic acid gas and other volatile constituents to a great extent and the material is taken from the cupola furnace and reduced to the proper granulated form, such granulated form being usually of a size to pass through approximately a five-eighths or three-fourths of an inch opening or meshed screen. The product as thus produced had a number of objectionable characteristics, some of which may be mentioned as impairment, owing to the presence of fine or powdered material, coke, cinder, ash and a small percentage of volatiles. The product thus obtained was furthermore not of a uniform character, owing to the fact that the raw rock placed in the cupola was required to be of a comparatively large size to enable the proper drafts through the cupola and the establishment of the required heat therein, so that the material, when removed from the cupola and crushed to a size approximating three-fourths to five-eighths of an inch, was found to contain many granules which had not been relieved of all of the volatiles contained therein. In the use of this material, as so treated, it was found that some of the improperly burned fine materials would escape through and into the checker work of the open hearth furnace and tend to destroy the brick of the checker work. Manufacturers therefore objected to the use of material containing not only volatiles, but also fine improperly burned materials.

In the practice of this art, I have endeavored to avoid these various objections by the employment of what is well known as the rotary style of roasting kiln. I have found that the rotary kiln process of treating dolomite is useful in many particulars, but it is impossible to treat the granular material thereby so as to relieve it of all the moisture and volatiles contained therein and at the same time to cause it to retain its best condition for sufficient length of time to render the product practical for all purposes. Furthermore, when it is attempted to remove the volatile matters from crushed raw dolomite by the rotary kiln process, the resultant product is very light and has been found for this reason to be more or less unsatisfactory. While, therefore, the rotary kiln method resulted in a product free from cinder or ash, yet, owing to the reasons above pointed out, the product produced thereby was not entirely satisfactory.

In the practice heretofore employed, the marketable material has been found to be of such a character as to very readily and quickly absorb moisture, so that during the shipment of the material from 10 to 15% of moisture would be absorbed before the material was used at the furnace. This was unsatisfactory especially in open hearth practice, when the presence of moisture is objectionable. In view of this objection, many manufacturers of steel have found it necessary to have shipped, direct to the plant, large rocks of dolomite, to burn, crush, and use the same at once in the furnaces so that no moisture would be allowed to accumulate in the material.

By my present method I have found that all of the objections heretofore suggested have been overcome, and that I am able to produce a material of substantially uniform character which is rendered free from foreign substances; properly burned so that practically all objectionable volatiles are driven off; and so constituted that but a relatively small percentage of moisture will be absorbed thereby for a period of time well within the time required for shipment to remote parts of the country and well within the time between shipment and date of use. I have also found that by the present process I am able to produce a material which is much heavier, volume for volume, than any manufactured dolomite heretofore produced, thus rendering the product available for purposes for which it has heretofore been thought impossible to use dolomite.

With the above in view, I practice the following process:—First crush the raw dolomite into lumps approximately two to four inches in diameter; charge the same into a cupola furnace of any approved type, alternating with layers of coke; firing the furnace; and then withdrawing the burned dolomite at intervals as in the old practice. I thereafter crush the burnt dolomite with such coke or cinder as may have remained, in a suitable apparatus and screen the same through a screen of approximately five-eighths to three-fourths inches mesh. The raw dolomite is subjected in the cupola to a heat approximately 2800° F., from two to four hours and I find that as a result of subjecting the lumps of dolomite to this heat, they are shrunk or condensed to a marked degree, so much so that dolomite burned in the cupola in this manner will weigh considerable more than an equal volume of raw unburned dolomite notwithstanding the fact that much of the volatile matter has been expelled from the raw dolomite. The product thus produced has mixed with it a material percentage of ash, coke, and fine or dust material (the latter being objectionable in furnace practice). The material is also manifestly unequally burned owing to the fact that the size of the rock introduced into the furnace is required to be sufficient to permit the proper draft through the furnace, and therefore the interiors of these large masses of rock have been found to be improperly burned and to contain volatiles objectionable for the reasons heretofore stated. The crushed product with the objectionable materials and characteristics, I then preferably, without further treatment, subject to a second burning, conveniently by introducing the same directly into a rotary kiln, and by further subjecting the said product to a degree of heat approximately 2400° F., the coke and cinder constituents of the mass are consumed, and the finer particles of dust are either fused or carried over into the up-take or otherwise eliminated by the draft. The dolomite granules are subjected to the requisite heat to drive off remaining volatiles which may be contained therein. In addition to relieving the granulated mass of the cinder, carbon and fine objectionable particles, by this process, I have also ascertained that the various granules which have been subjected to the burning action in the rotary kiln are rendered much less pervious to moisture than heretofore. This I attribute in a great measure to the fact that when the granules are burned in the rotary kiln, they are further shrunk or condensed, and I have found that the material after being treated in the rotary kiln in the manner above described, will volume for volume weigh considerably more than either the raw dolomite stone or the dolomite after it has been roasted in the cupola. In fact, the material which is obtained from the rotary kiln is substantially volume for volume, is much heavier than the material obtained from the cupola, as the material obtained from the cupola is heavier than the raw dolomite, and the product which is obtained in this manner is almost twice as heavy, volume for volume, as the product which is obtained when it is endeavored to roast granulated dolomite in accordance with the rotary process. The product is also found to be substantially uniform in its physical characteristics.

The fact that the material obtained by the present process is for a considerable period of time substantially impervious to moisture, may be also due in some measure to the presence of a small percentage of silicious materials contained in the coke which has been passed into the kiln with the roasted dolomite, and also to the fact that coke has been used in the cupola under the first step of the treatment. While I have not ascertained definitely the cause of this particular action, from which the beneficial results are obtained, I have found that the product will not, for a considerable time, absorb any appreciable amount of moisture. In fact, I have found that shipments of this material can be delivered hundreds of miles distant and that for a period of twenty-five or thirty days, the material will have absorbed no objectionable amount of moisture. I am therefore able to supply the steel works with a material which is in substantially perfect condition for use, and, in fact, in a condition which has heretofore been commercially impossible. This will be apparent when it is understood that dolomite quarries are not ordinarily located in the immediate vicinities of steel works.

As a replacing and repairing material dolomite, in the condition which I am now able to produce and supply the same, is important from a standpoint of economy on behalf of steel manufacturers, but I wish it understood that the material produced by the present method may be employed for purposes other than that of repairing the slag line of the furnaces. In fact, the material can be used with good results owing to its dense character, for closing the tap holes in furnaces and also for building up furnace bottoms. This is very important as it enables the use of my substantially perfectly prepared dolomite for purposes in connection with which dolomite has heretofore been found impractical, and for which purposes it has been necessary to use magnesite which must be imported and is very expensive.

The granules of the completed product, as far as I have been able to ascertain, are substantially uniform in character and they have a slightly silicious and dense outer surface part, and to distinguish the material from that produced separately by either the cupola or rotary kiln processes, the same may be characterized as "double burned dolomite."

I wish it to be understood that the method is not limited to the use of any particular apparatus and that the steps thereof may be somewhat varied without departing from the nature and principle of the invention.

What I claim is:—

1. The method of producing a dolomite material for repairing furnace linings and the like, consisting in burning raw dolomite rock, breaking the burned rock, and subsequently reburning the broken rock to produce a uniform product.

2. The method of producing a dolomite material for repairing furnace linings and the like consisting in first burning the raw rock in a cupola furnace, breaking the burned rock, and finally reburning the broken rock.

3. The method of producing dolomite material for repairing furnace linings and the like consisting in first burning the raw rock in a cupola furnace, breaking the burned rock, and finally reburning the broken rock in a rotary kiln.

4. The method of producing a dolomite material for repairing furnace linings and the like consisting in burning raw dolomite rock, breaking, and subsequently reburning the burned rock by subjecting the same to a high degree of heat uniformly burning the various particles of the mass.

5. The method of producing a dolomite material for repairing furnace linings and the like consisting in burning raw dolomite rock, granulating the same and subsequently reburning the burnt rock in granular form.

6. The method of producing a dolomite material for repairing furnace linings and the like consisting in burning raw dolomite rock in the presence of a carbon fuel, breaking the burned rock, and finally reburning the broken rock to produce a uniformly burned product.

7. The method of producing a dolomite material for repairing furnace linings and the like consisting in first burning raw dolomite rock, breaking the rock into size to pass through an approximately three-quarter inch opening, and finally reburning the reduced rock.

8. The method of producing a dolomite material for repairing furnace linings and the like consisting in burning raw dolomite in the presence of a combustible, reducing the burned rock, and subjecting the reduced material while in a free state to the action of heat to relieve the product of objectionable materials and to reburn the dolomite.

9. The method of producing a dolomite material for repairing furnace linings and the like consisting in burning raw dolomite by subjecting the raw stone to a heat of approximately 2800° F., breaking the rock into granules, and subjecting such granules to an intense heat.

10. The method of producing a dolomite material for repairing furnace linings consisting in first subjecting the raw rock to a heat sufficient to drive off the volatile matters therefrom and condense the rock, breaking the rock so treated into granules, and subjecting the granules to intense heat to further condense the same.

In testimony whereof I affix my signature in presence of two witnesses.

JOHN E. BAKER.

Witnesses:
S. D. WAREHEIM,
FREDERICK B. GERBER.